US011248529B2

(12) United States Patent
Vandervort et al.

(10) Patent No.: US 11,248,529 B2
(45) Date of Patent: Feb. 15, 2022

(54) METHODS FOR STARTUP AND OPERATION OF GAS TURBINE COMBINED CYCLE POWER PLANTS USING NMHC FUELS (71) Applicant: General Electric Company, Schenectady, NY (US)

(72) Inventors: Christian Lee Vandervort, Voorheesville, NY (US); William J. Lawson, Niskayuna, NY (US); Jeffrey Scott Goldmeer, Latham, NY (US)

(73) Assignee: General Electric Company, Schenectady, NY (US)

(*) Notice: Subject to any disclaimer, the term of this patent is extended or adjusted under 35 U.S.C. 154(b) by 664 days.

(21) Appl. No.: 15/728,883

(22) Filed: Oct. 10, 2017

(65) Prior Publication Data
US 2018/0163628 A1 Jun. 14, 2018

Related U.S. Application Data (60) Provisional application No. 62/433,374, filed on Dec. 13, 2016.

(51) Int. Cl.
*F02C 7/224* (2006.01)
*F02C 6/18* (2006.01)
(Continued)

(52) U.S. Cl.
CPC .............. *F02C 7/224* (2013.01); *F01K 23/10* (2013.01); *F02C 3/30* (2013.01); *F02C 6/18* (2013.01);
(Continued)

(58) Field of Classification Search
CPC .... F02C 7/224; F02C 3/30; F02C 6/18; F02C 7/264; F02C 9/40; F01K 23/10;
(Continued)

(56) References Cited

U.S. PATENT DOCUMENTS 5,449,568 A * 9/1995 Micheli .................... F02C 1/05
429/434
5,617,716 A * 4/1997 Schreiber .................. F02C 3/30
60/39.182

(Continued)

OTHER PUBLICATIONS

Wisniewski et al., Expanding Fuel Flexibility Capability in GE's Aeroderivative Engines, GT2010-23546, ASME Turbo Expo 2010: Power for Land, Sea and Air, vol. 2: Combustion, Fuels and Emissions, Parts A and B, Jun. 14-18, 2010, pp. 1209-1218.

(Continued)

*Primary Examiner* — Arun Goyal
*Assistant Examiner* — Henry Ng
(74) *Attorney, Agent, or Firm* — Dority & Manning, P.A.

(57) ABSTRACT

A method for starting and operating a NMHC fueled gas turbine combined cycle power plant includes injecting gaseous NMHC fuel into a gaseous NMHC fuel treatment system, injecting at least one of auxiliary steam, HRSG steam, or HRSG water into the gaseous NMHC fuel treatment system, and mixing the at least one of auxiliary steam, HRSG steam, or HRSG water with the gaseous NMHC fuel in the NMHC fuel treatment system to form a gaseous NMHC fuel mixture. The method further includes injecting the gaseous NMHC fuel mixture into a gaseous NMHC fuel distribution system, and providing the gaseous NMHC fuel mixture through the gaseous NMHC fuel distribution system to a combustor of the NMHC fueled gas turbine.

15 Claims, 8 Drawing Sheets (51) Int. Cl.
*F01K 23/10* (2006.01)
*F02C 7/264* (2006.01)
*F02C 3/30* (2006.01)
*F02C 9/40* (2006.01)

(52) U.S. Cl.
CPC .............. *F02C 7/264* (2013.01); *F02C 9/40* (2013.01); *F05D 2220/32* (2013.01); *F05D 2220/75* (2013.01); *F05D 2240/35* (2013.01); *F05D 2260/20* (2013.01); *F05D 2260/85* (2013.01); *F23R 2900/00002* (2013.01); *Y02E 20/16* (2013.01); *Y02E 50/10* (2013.01)

(58) Field of Classification Search
CPC ............. F05D 2220/32; F05D 2220/75; F05D 2240/35; F05D 2260/20; F05D 2260/85; F23R 2900/00002; Y02E 20/16; Y02E 50/11
See application file for complete search history.

(56) References Cited

U.S. PATENT DOCUMENTS

| | | | | |
|---|---|---|---|---|
| 5,806,298 | A * | 9/1998 | Klosek | F02C 3/24 60/39.465 |
| 6,201,029 | B1 * | 3/2001 | Waycuilis | C01B 3/382 252/373 |
| 6,338,239 | B1 * | 1/2002 | Hirata | B01B 1/005 60/39.12 |
| 7,322,198 | B2 * | 1/2008 | Roby | F02C 3/24 60/776 |
| 7,827,794 | B1 | 11/2010 | Pronske et al. | |
| 7,895,821 | B2 | 3/2011 | Annigeri et al. | |
| 8,042,340 | B2 | 10/2011 | Ma et al. | |
| 9,163,839 | B2 | 10/2015 | Westmoreland et al. | |
| 2003/0217555 | A1 | 11/2003 | Gerhold | |
| 2006/0196483 | A1 * | 9/2006 | Magyari | F02C 7/224 123/538 |
| 2010/0170266 | A1 * | 7/2010 | Dinu | F02C 7/224 60/787 |
| 2013/0255271 | A1 * | 10/2013 | Yu | F02C 7/22 60/776 |
| 2014/0190173 | A1 * | 7/2014 | Ozawa | F02C 3/14 60/773 |
| 2014/0238039 | A1 * | 8/2014 | Zhang | F02C 7/236 60/778 |
| 2015/0184590 | A1 * | 7/2015 | Conlon | F02C 3/22 60/772 |
| 2015/0321155 | A1 * | 11/2015 | Kim | C10L 3/00 366/148 |

OTHER PUBLICATIONS

Extended European Search Report and Opinion issued in connection with corresponding EP Application No. 17204096.6 dated May 7, 2018.

Beadie, D.F., et al., System and method for providing highly reactive fuels to a combustor, GE co-pending U.S. Appl. No. 62/195,918, filed Jul. 23, 2015.

* cited by examiner

METHODS FOR STARTUP AND OPERATION OF GAS TURBINE COMBINED CYCLE POWER PLANTS USING NMHC FUELS

CROSS-REFERENCE TO RELATED APPLICATIONS

This application is based upon and claims the benefit of priority from U.S. Provisional Application No. 62/433,374, filed Dec. 13, 2016 in the United States Patent and Trademark Office, and which is incorporated by reference herein in its entirety.

FIELD

The present invention relates to the liquid and gas fuel supplied to a gas turbine in a combined cycle power plant, and more particularly to a system and method that uses steam injection to modulate the properties of the fuel.

BACKGROUND

A combined cycle power plant utilizes a gas turbine engine and a steam turbine engine in combination to produce power. The power plant is arranged such that the gas turbine engine is thermally connected to the steam turbine engine through a heat recovery steam generator ("HRSG"). The HRSG is a non-contact heat exchanger that allows feedwater for the steam generation process to be heated by otherwise wasted gas turbine engine exhaust gases. The HRSG is a large duct with tube bundles interposed therein such that water is heated to steam as the exhaust gases pass through the duct.

The gas turbine engines in the combined cycle are often natural gas-fired and are commonly used to drive electrical generators. Such gas turbines are designed to burn a specific range of fuels, wherein the rate of fuel consumed may depend on the fuel's chemical composition. Many of the gas turbine combustors achieve low NOx emissions levels by employing lean premixed combustion wherein the fuel and an excess of air that is required to burn all the fuel are mixed prior to combustion to control and limit thermal NOx production. This class of combustors, often referred to as Dry Low NOx (DLN) combustors, requires more careful management of combustion conditions to achieve stable operation and acceptable NOx and CO emissions while remaining free of pressure oscillations, called dynamics, which are usually related to the combination of acoustics and unsteady energy release during the combustion process.

Due to the increase in natural gas demand, the supply of pipeline natural gas may, on occasion, become unable to satisfy the demand for natural gas fuel by the combined cycle power plant. As a result, gas turbine operators are constantly looking for suitable alternate fuels to burn within their gas turbines in place of the natural gas until the natural gas supply is restored. One example of a potential alternate fuel is non-methane hydrocarbons (NMHC). With the introduction of hydraulic fracturing as a means to extract natural gas, a large surplus of one NMHC, ethane, is being generated. Another common natural gas alternative in many parts of the world is liquefied natural gas (LNG). The search for suitable alternatives has led to startup and operations of the gas turbines using a variety of fuels, including lean methane, non-methane hydrocarbons, crude oil, and syngas. The category of non-methane hydrocarbons now includes ethane, propane and more generally liquid petroleum gas (LPG), which are becoming available in suitable quantities. Ethane, propane and LPG can be used for power generation, and there is now an option for exporting all of them as LNG alternatives for power generation.

There are various technical challenges associated with substituting one fuel such as ethane or other NMHC fuel for another fuel in a gas turbine combustor, particularly in combustors that are highly tuned over a narrow range of operating conditions based on the various fuel properties (i.e. fuel density, reactivity and Wobbe index) of the fuel. NMHC fuels with increased (or reduced) heating value, such as ethane, could have an increased risk of damaging combustion dynamics, flame flashback or increased NOx emissions.

Therefore, there is a need for a system and method for reducing the higher heating value (HHV) of an alternate NMHC fuel such as ethane. The system and method should permit adjustment of the Modified Wobbe Index (MWI) over a wide range without the need for significant temperature adjustment of the gas fuel. The system and method should provide a diluent for reducing the lower heating value (LHV) and the resulting MWI.

BRIEF DESCRIPTION

Aspects and advantages of the invention are set forth below in the following description, or may be obvious from the description, or may be learned through practice of the invention.

One embodiment is a method for starting and operating a NMHC fueled gas turbine combined cycle which includes starting an auxiliary boiler to generate auxiliary steam; starting a heat recovery steam generator (HRSG) to generate HRSG water and HRSG steam; supplying at least one of auxiliary steam, HRSG steam, and HRSG water to a NMHC fuel vaporizer heat exchanger to generate gaseous NMHC fuel from a liquid NMHC fuel supply; injecting the gaseous NMHC fuel into a gaseous NMHC fuel treatment system; injecting at least one of auxiliary steam, HRSG steam and HRSG water into the gaseous NMHC fuel treatment system; mixing at least one of auxiliary steam, HRSG steam and HRSG water with the gaseous NMHC fuel to form a gaseous NMHC fuel mixture; injecting the gaseous NMHC fuel mixture into at least one preselected premix fuel circuit of the gaseous NMHC fuel distribution system; and igniting and accelerating the gas turbine to base load through predefined modes of operation.

Another embodiment is a method for starting and operating a NMHC fueled gas turbine combined cycle as described above without the step of supplying at least one of auxiliary steam, HRSG steam, and HRSG water to a NMHC fuel vaporizer heat exchanger to generate gaseous NMHC fuel from a liquid NMHC fuel supply.

Another embodiment is a method of starting and operating a NMHC fueled gas turbine combined cycle through a series of predefined modes of operation.

Another embodiment is a method for starting and operating a NMHC fueled gas turbine combined cycle power plant. The method includes injecting gaseous NMHC fuel into a gaseous NMHC fuel treatment system, injecting at least one of auxiliary steam, HRSG steam, or HRSG water into the gaseous NMHC fuel treatment system, and mixing the at least one of auxiliary steam, HRSG steam, or HRSG water with the gaseous NMHC fuel in the NMHC fuel treatment system to form a gaseous NMHC fuel mixture. The method further includes injecting the gaseous NMHC fuel mixture into a gaseous NMHC fuel distribution system, and providing the gaseous NMHC fuel mixture through the gaseous NMHC fuel distribution system to a combustor of the NMHC fueled gas turbine.

Another embodiment is a method for starting and operating a NMHC fueled gas turbine combined cycle power plant. The method includes starting an auxiliary boiler to generate auxiliary steam, starting a heat recovery steam generator (HRSG) to generate HRSG water and HRSG steam, and injecting gaseous NMHC fuel into a gaseous NMHC fuel treatment system. The method further includes injecting at least one of auxiliary steam, HRSG steam, or HRSG water into the gaseous NMHC fuel treatment system, and mixing the at least one of auxiliary steam, HRSG steam, or HRSG water with the gaseous NMHC fuel in the NMHC fuel treatment system to form a gaseous NMHC fuel mixture. The method further includes injecting the gaseous NMHC fuel mixture into at least one preselected premix fuel circuit of a gaseous NMHC fuel distribution system, and igniting and accelerating the gas turbine.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term non-methane hydrocarbon (NMHC) fuels refers to a category of high hydrocarbon fuels including ethane, propane and LPG. The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. For example, although an industrial, marine, or land based gas turbine is shown and described herein, the present disclosure as shown and described herein is not limited to a land based and/or industrial, and/or marine gas turbine unless otherwise specified in the claims. The disclosure as described herein may, for example, be used in any type of turbine including but not limited to an aero-derivative turbine or marine gas turbine.

Figure 1:
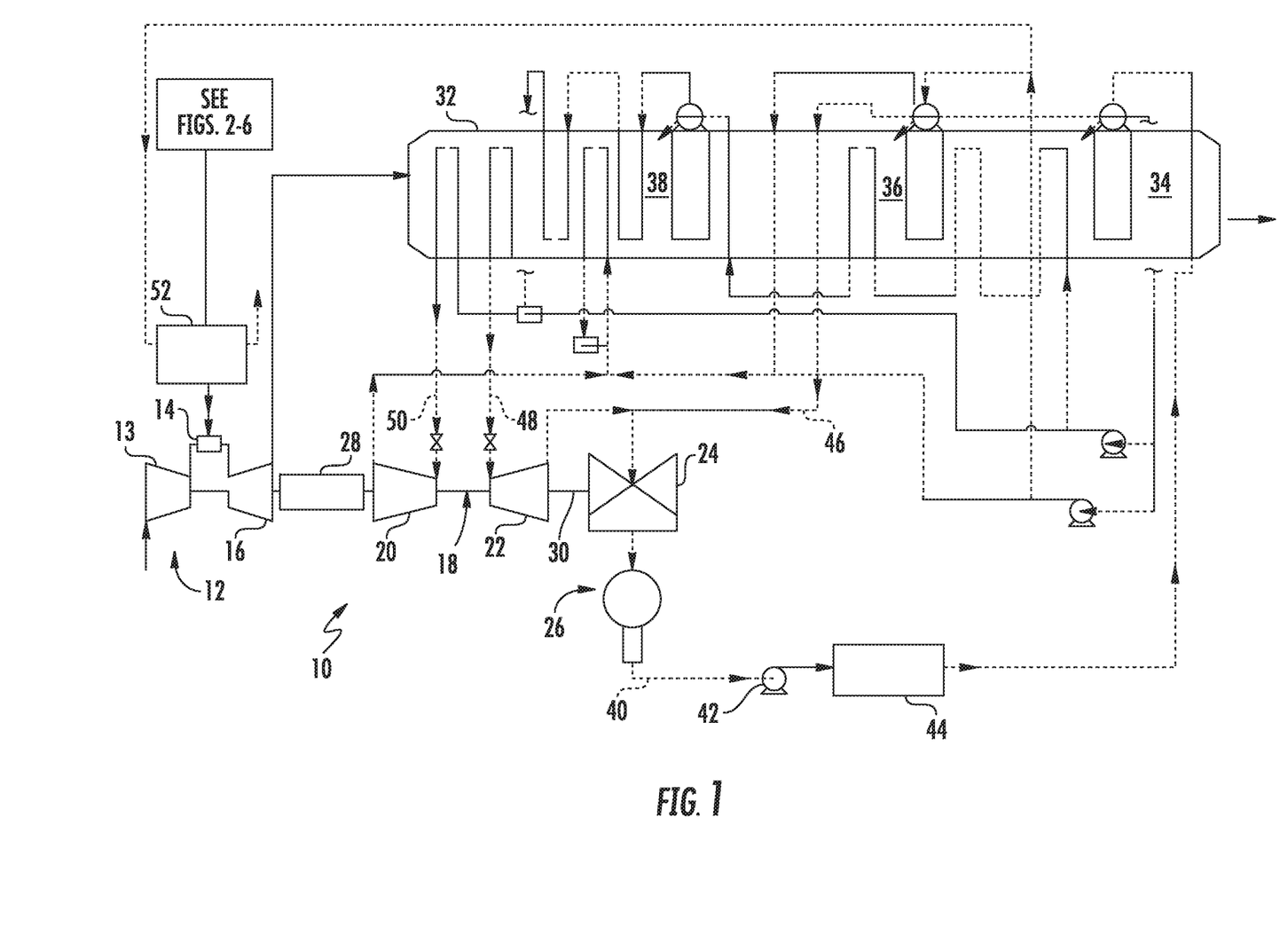
FIG. 1 is a schematic of an exemplary gas turbine combined cycle power plant in accordance with embodiments of the present disclosure.

Referring now to the drawings, wherein identical numerals indicate the same elements throughout the figures, FIG. 1 is a schematic of an exemplary gas turbine combined cycle power plant 10. The power plant 10 includes a gas turbine engine system 12 with a compressor section 13, a combustion system including one or more combustors 14, and a turbine section 16. The power plant 10 further includes a steam turbine engine system 18. The steam turbine engine system 18 includes a high pressure section 20, an intermediate pressure section 22 and one or more low pressure sections 24 with multiple steam admission points at the different pressures. The low pressure section 24 exhausts into a condenser 26. The steam turbine engine system 18 and the gas turbine engine 12 drive a generator 28 that produces electrical power. The gas turbine engine system 12, the steam turbine engine system 18 and the generator 28 may be arranged on a single shaft 30. Other configurations may be used.

The steam turbine engine system 18 is associated with a multi-pressure heat recovery steam generator (HRSG) 32. The HRSG 32 is a counter flow heat exchanger in which feedwater that passes through the HRSG 32 is heated as exhaust gas output from the gas turbine engine system 12, gives up heat and becomes cooler. The HRSG 32 can have three (3) different operating pressures (high, intermediate, and low) with components to generate steam at the various pressures and temperatures. This steam is used as vapor feed to the corresponding stages of the steam turbine engine system 18. The HRSG 32 may include, for example, a lower pressure section 34, an intermediate pressure section 36 and a high pressure section 38, each of which may generally include one or more economizers, evaporators and/or super heaters.

Condensate is fed from the condenser 26 to the HRSG 32 via one or more conduits 40 with the aid of a condensate pump 42. A gland seal condenser 44 disposed downstream from the condensate pump 42 also may be used for secondary condensing operations. The condensate subsequently passes from the condensate pump 42 through the low pressure section 34 of the HRSG 32. In a known manner, steam from the low pressure section 34 is fed to the low pressure section 24 of the steam turbine system 18 via a conduit 46. Condensate and/or feedwater pass through the intermediate section 36 and are returned to the intermediate pressure section 22 of the steam turbine system 18 via a conduit 48. Finally, condensate is passed through the high pressure section 38 of the HRSG 32 and is returned to the high pressure section 20 of the steam turbine system 18 via a conduit 50. Hot water produced via the HRSG 32 also may be used for a fuel heating system 52.

Figure 2:
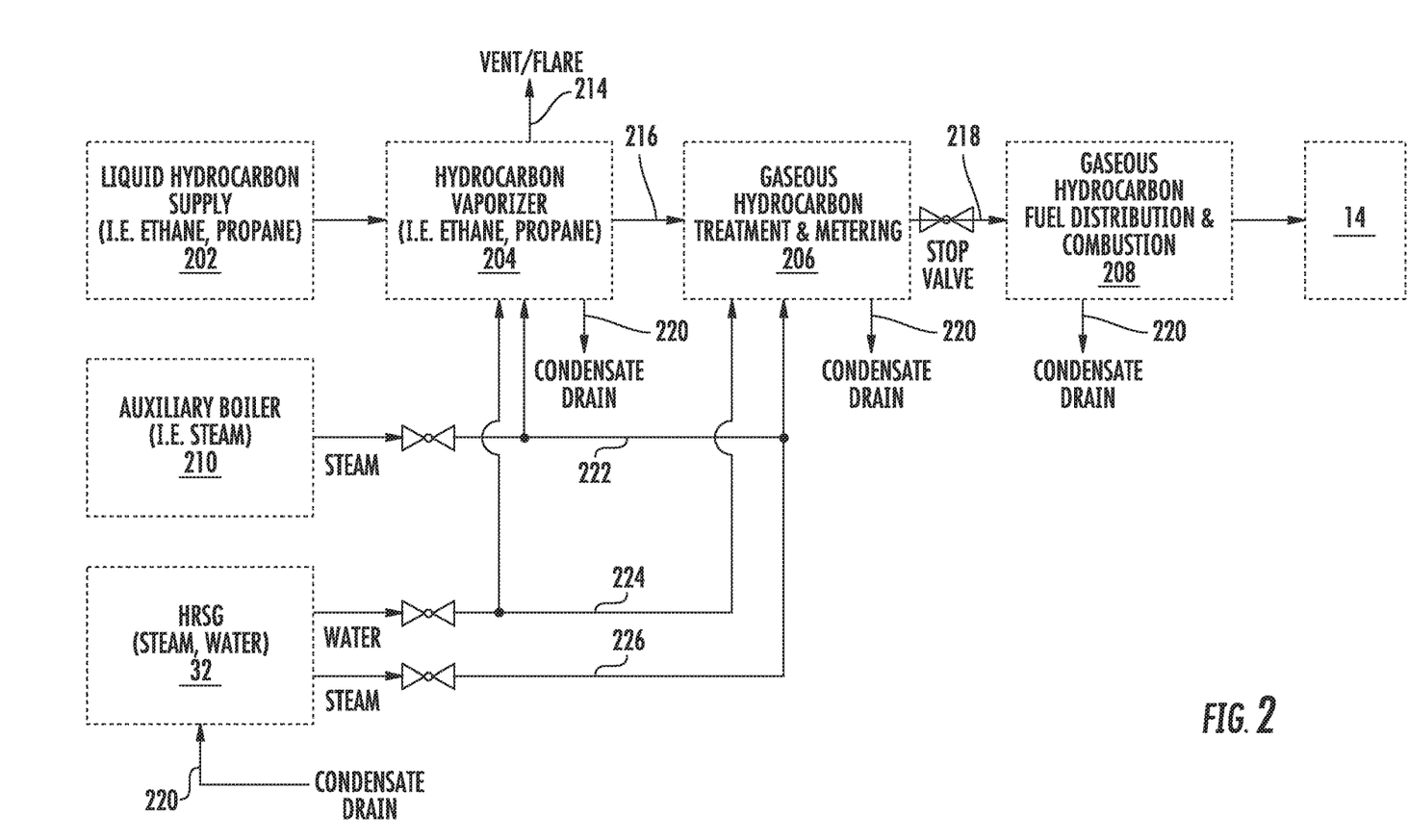
FIG. 2 is a schematic of an NMHC fuel supply system vaporizing liquid NMHC fuel into gaseous NMHC fuel that is diluted prior to combustion in accordance with embodiments of the present disclosure.

FIG. 2 is a schematic of an exemplary NMHC fuel supply system for vaporizing liquid NMHC fuel 202 into gaseous NMHC fuel 216 that is diluted prior to combustion. Start-up and operation of a DLN equipped gas turbine combined cycle power plant 10 can be accomplished using liquid phase NMHC fuels 202 such as ethane, propane, or LPG, alone or in a suitable mixture. Liquid NMHC fuels 202 can be stored in tanks at sufficiently low temperatures and under pressure to preclude vaporization and then vaporized by a liquid NMHC vaporizer 204 to generate a gaseous NMHC fuel 216. Gaseous NMHC fuel 216 may include ethane, propane, LPG, syngas, or any suitable mixture thereof. Heat source for the vaporizer 204 can be auxiliary steam 222 from an auxiliary boiler 210, HRSG water 224 from a heat recovery steam generator (HRSG) 32, HRSG steam 226 from a heat recovery steam generator (HRSG) 32, an electrical heating source, or mixtures thereof. The gaseous NMHC fuel 216 can be blended with (diluted by) the auxiliary steam 222, HRSG steam 226, HRSG water 224 or mixtures thereof in a gaseous NMHC treatment and metering system 206 to generate a NMHC fuel mixture 218. The NMHC fuel mixture 218 is supplied to a gaseous NMHC fuel distribution system 208 which distributes the NMHC fuel mixture 218 to combustors 14 (such as in some embodiments via fuel heating system 52). The NMHC fuel mixture 218 can be used for startup (ignition, cross-fire and acceleration) and for loaded operation. Both steam and NMHC fuel systems will likely require sufficient vent/flare 214 points and condensate 220 drain points to facilitate removal of entrained liquids. For NMHC fuels such as ethane, a flare system that includes ignition and flame stabilization may be needed to enable combustion of vented ethane. Alternatively, a system for collection of multi-phase ethane then condensing and returning the ethane to the liquid ethane storage tanks could be used.

Figure 7:
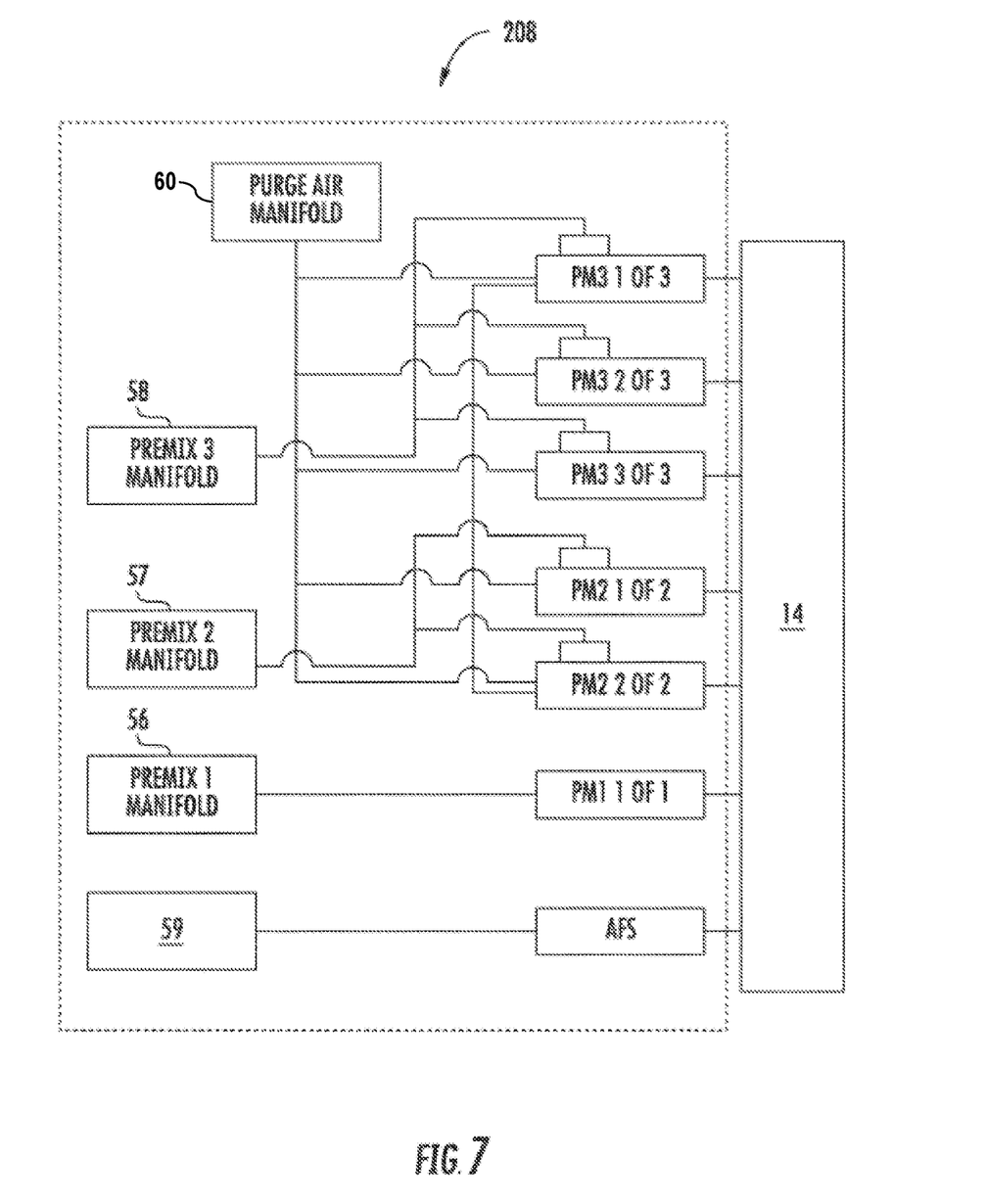
FIG. 7 is a schematic of a DLN combustion system in accordance with embodiments of the present disclosure.

The gaseous NMHC distribution system 208 can be characteristic of a DLN fuel system having premix (PM) fuel circuits as shown in FIG. 7. The DLN fuel system can include; a PM1 circuit 56 to deliver fuel to a center nozzle of a combustor 14, a PM2 circuit 57 that delivers fuel to two nozzles located nearest to the cross-fire tubes of a combustor 14, a PM3 circuit 58 that delivers fuel to the remaining outer fuel nozzles of a combustor 14, and axial fuel staging (AFS) circuit 59, for example a late lean injection (LLI) circuit, that delivers fuel to the axial fuel staging system of a combustor 14. NMHC fuel enters supply manifolds to each circuit that is ultimately introduced to a gas turbine combustor 14. Purge air for passages which do not receive a fuel supply in all modes of operation can be supplied to the five outer fuel nozzles via a purge air manifold 60.

Figure 3:
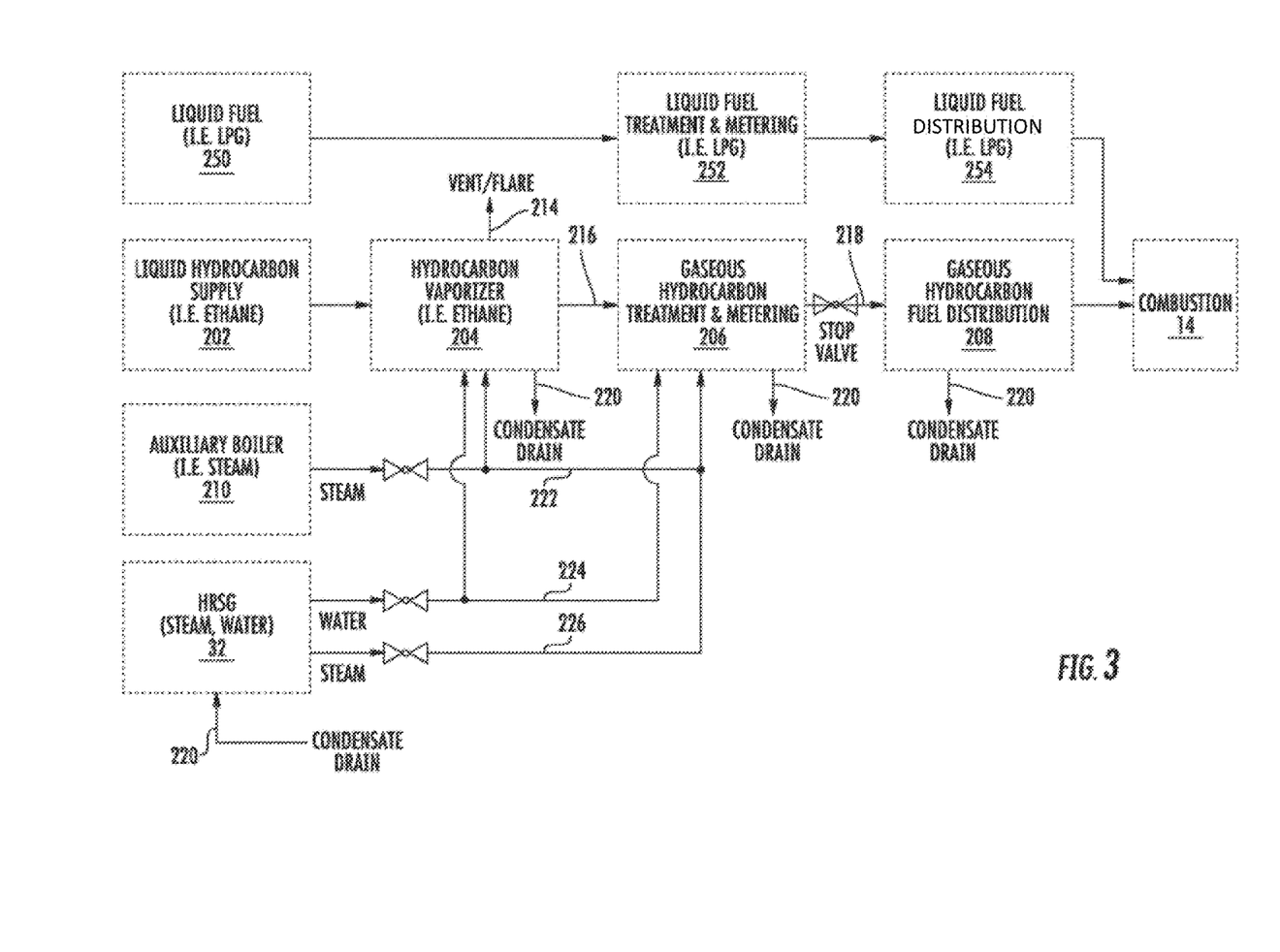
FIG. 3 is a schematic of a combined liquid and gas NMHC fuel supply system fuel that is diluted prior to combustion in accordance with embodiments of the present disclosure.
Figure 4:
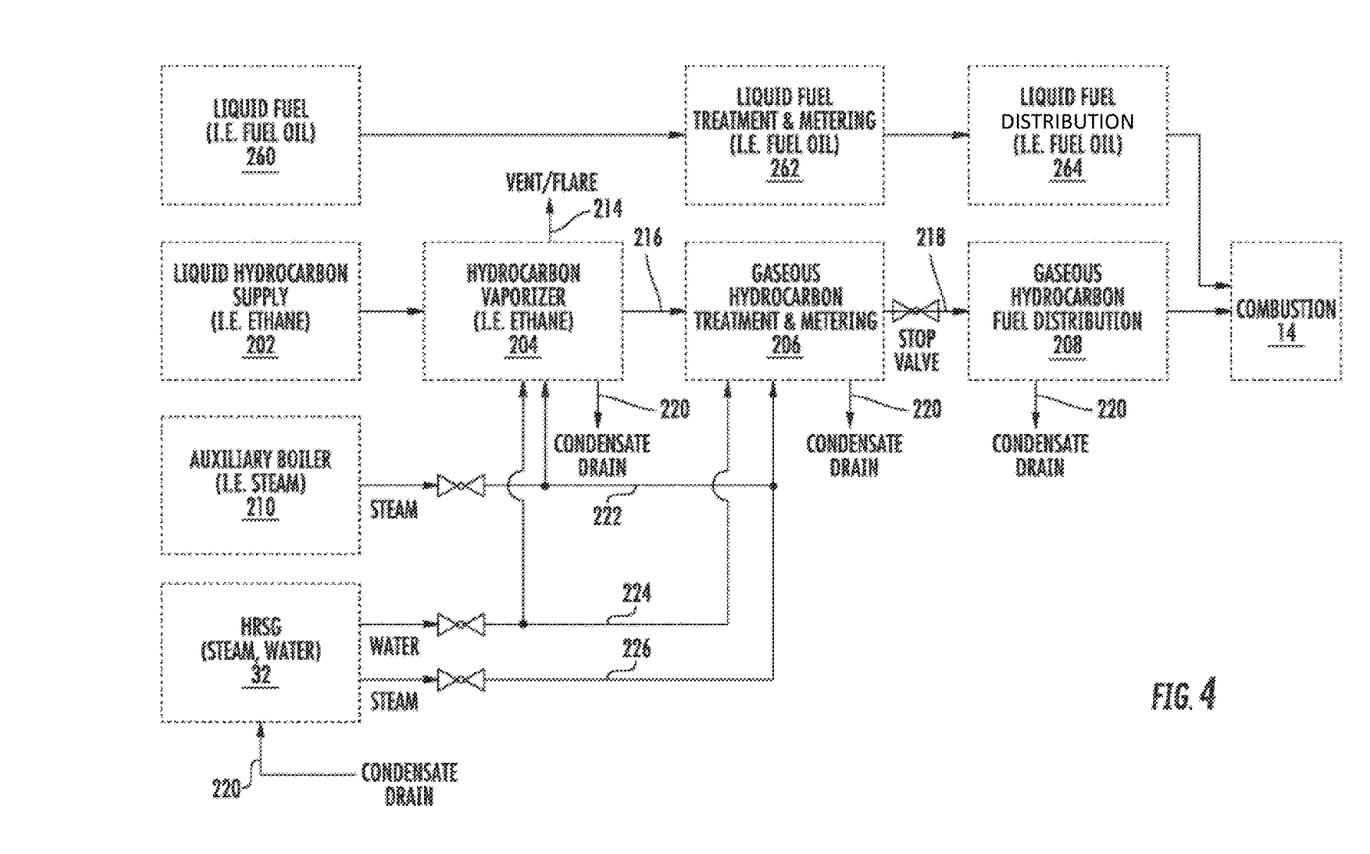
FIG. 4 is a schematic of a combined fuel oil and gas NMHC fuel supply system that is diluted prior to combustion in accordance with embodiments of the present disclosure.
Figure 5:
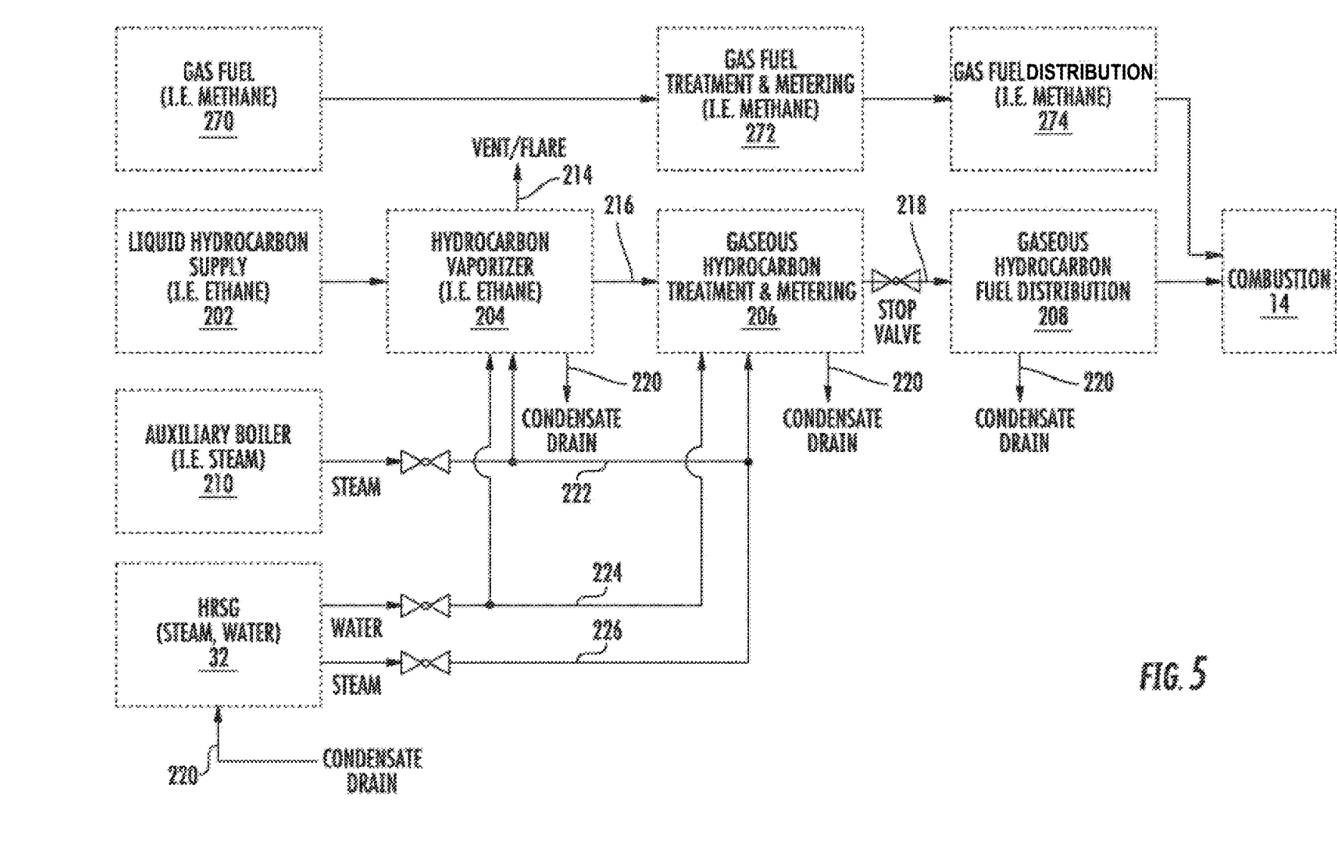
FIG. 5 is a schematic of a combined methane fuel supply and NMHC fuel supply system that is diluted prior to combustion in accordance with embodiments of the present disclosure.
Figure 6:
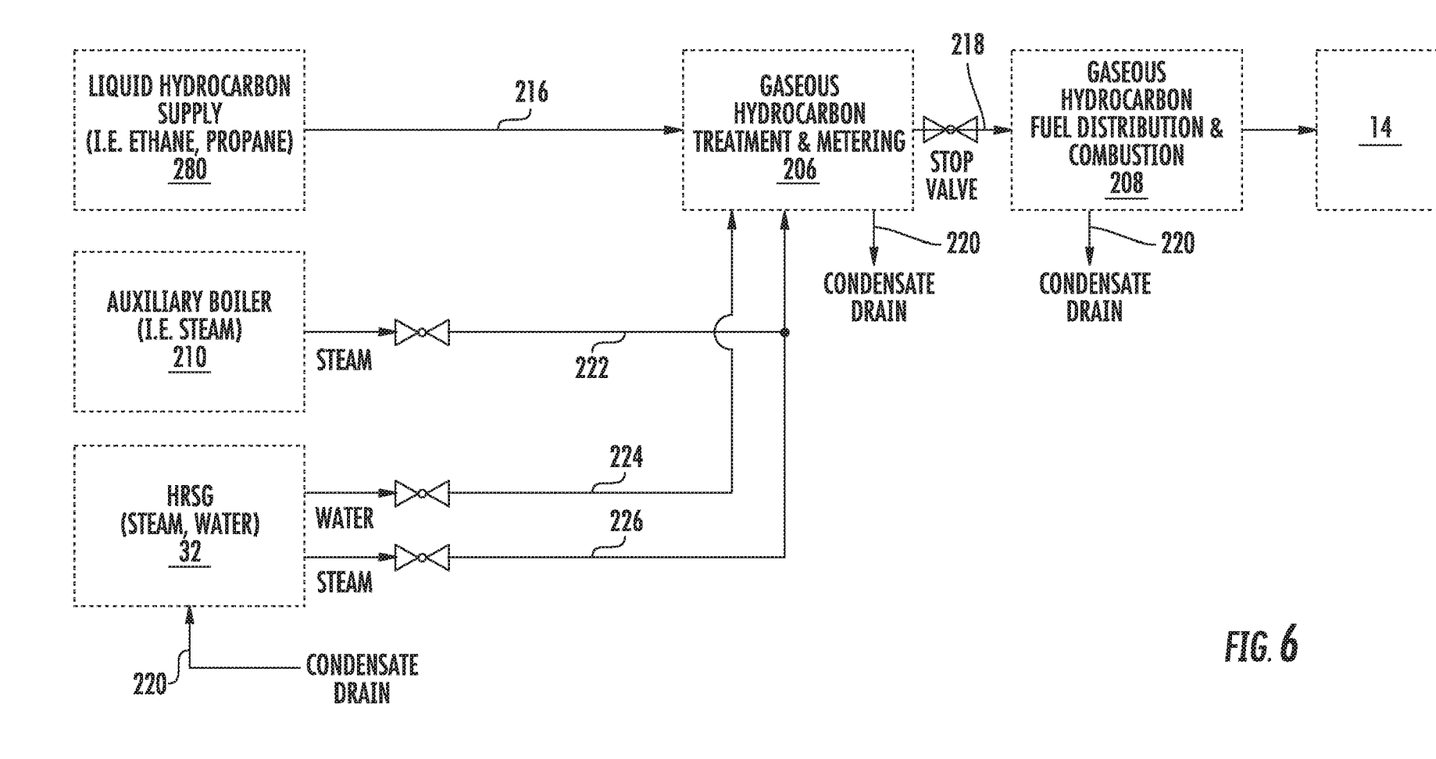
FIG. 6 is a schematic of a NMHC gaseous fuel supply system that is diluted prior to combustion in accordance with embodiments of the present disclosure.

FIG. 3 shows a variant of FIG. 2 by adding a liquid NMHC fuel distribution system 254 to enable a liquid NMHC fuel 250, such as LPG, to feed a liquid NMHC treatment and metering system 252 prior to being distributed to combustor 14, such as via liquid NMHC fuel injectors of the liquid NMHC fuel distribution system 254. Within the liquid NMHC treatment and metering system 252, the liquid NMHC fuel 250 may be filtered and may undergo pressure control and flow metering to prepare the fuel 250 for being provided to the distribution system 254. The liquid NMHC fuel injector can include at least one of an atomizing type, an atomizing type with a steam diluent, a micromixer for single or dual fuel usage, or mixtures thereof. FIG. 4 shows another variant of FIG. 2 by adding a liquid fuel distribution system 264 to enable a non-NMHC liquid fuel 260, such as fuel oil, to feed a liquid fuel treatment and metering system 262 prior to being distributed to combustor 14, such as via liquid fuel injectors of the liquid non-NMHC fuel distribution system 264. Within the liquid non-NMHC treatment and metering system 262, the non-NMHC liquid fuel 260 may be provided through fuel forwarding pumps, fuel straining apparatus, fuel coalescing apparatus, filtration apparatus, fuel heating apparatus, and/or flow metering apparatus to prepare the fuel 260 for being provided to the distribution system 264. The liquid fuel injector can include at least one of an atomizing type, an atomizing type with a steam diluent, a micromixer for single or dual fuel usage, or mixtures thereof. The micromixer herein can include an end plate, a plurality of base nozzle structures in a circumferential array, a plurality of segmented mixing tubes, a plurality of fuel plenums, and a removable end cap as taught in commonly owned U.S. Pat. No. 9,163,839, which is incorporated herein by reference in its entirety. FIG. 5 shows yet another variant of FIG. 2 by adding a gas fuel distribution system 274 to enable a non-NMHC gas fuel 270, such as methane or natural gas, to feed a gas fuel treatment and metering system 272 prior to being distributed to combustor 14, such as via fuel injectors of the gas non-NMHC fuel distribution system 274. Within the gas fuel treatment and metering system 272, the non-NMHC gas fuel 270 may be provided through fuel coalescing apparatus, filtration apparatus, fuel heating apparatus, and/or flow metering apparatus to prepare the fuel 270 for being provided to the distribution system 274. The gas fuel injector can include a steam diluent for MWI adjustment, a micromixer for single or dual fuel usage, or mixtures thereof. FIG. 6 shows a NMHC gas-only fuel distribution system 208 to enable a NMHC gas fuel 280, such as ethane or propane, to feed a gas fuel treatment and metering system 206 prior to being distributed to combustor 14, such as via fuel injectors.

Figure 8:
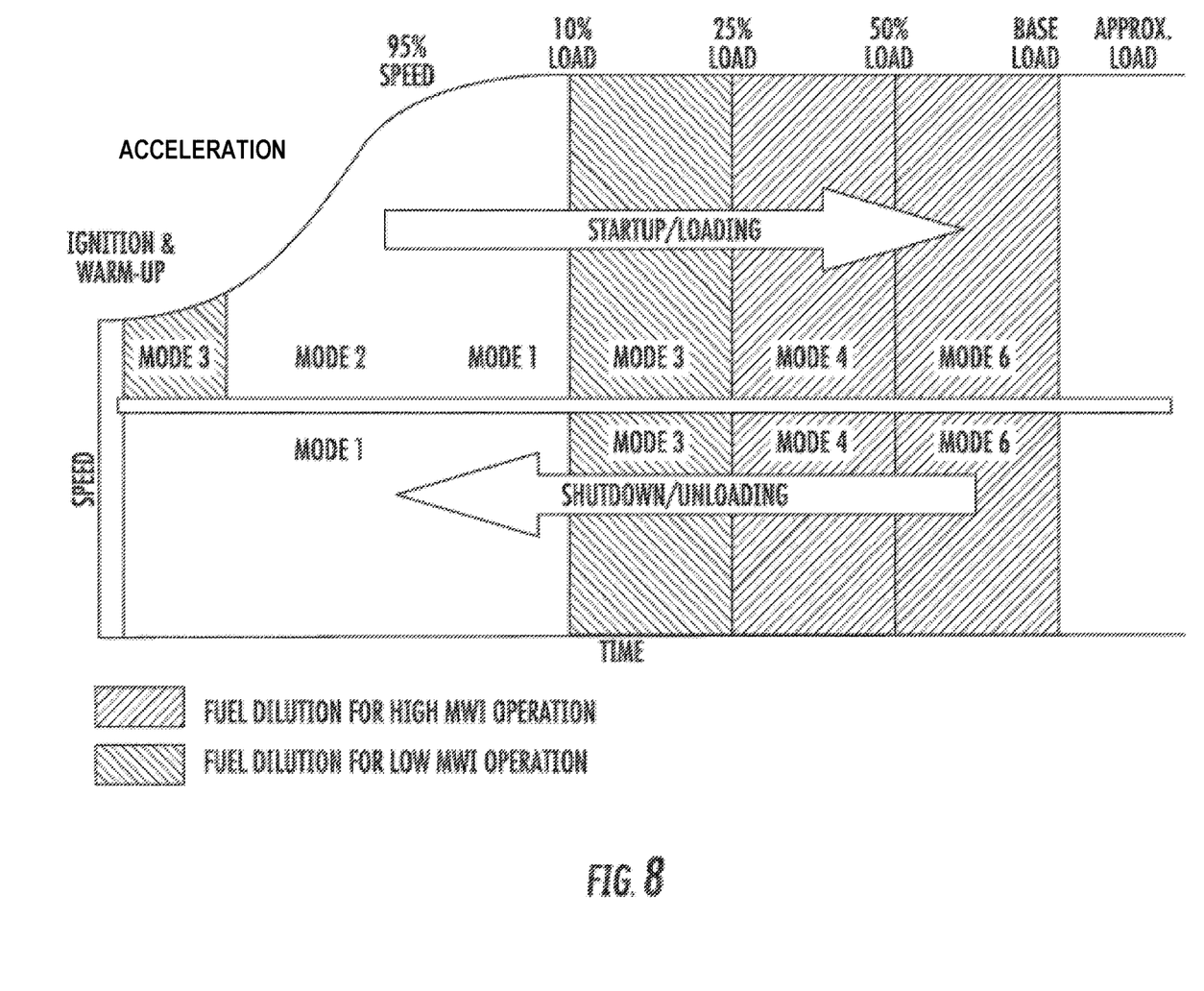
FIG. 8 is a graph showing startup and operating modes of a gas turbine combined cycle power plant in accordance with embodiments of the present disclosure.

In one embodiment, a method for startup of the gas turbine can include a means for preheating of the fuel piping and manifold systems, such as via fuel heating system 52. Fuel heating system 52 may, for example, be upstream or downstream of fuel distribution system 208 and upstream of combustor 14. Note that the term 'doped', as used below, is synonymous with the term 'injected'. Startup can be performed with a steam-doped NMHC such as steam-doped ethane. In both cases, the piping and manifolds can experience a heat-up cycle to avoid condensation of steam, ethane or other NMHC fuels. This could be achieved by flow of steam from an auxiliary boiler into the appropriate fuel piping system. Following heat-up of the system and appropriate purging, the gas turbine is set to the appropriate ignition speed to enter a series of predefined modes of operation starting with Mode 3 as shown in FIG. 8. Fuel is supplied to a subset of the nozzles in a premix circuit, as shown in FIG. 7, likely PM1 and PM2. The system ignites, cross-fires and begins to accelerate the gas turbine engine. Fuel is supplied to the PM1 and/or PM2 fuel systems per a predefined mode of operation as it passes through Mode 2 and Mode 1 to reach the synchronous speed, about 100% speed, and then synchronized to the electrical grid. For systems with dry start, steam dilution would be initiated just after synchronization, at Mode 3, to achieve the desired steam-fuel ratio. The gas turbine can undergo a mode transfer from operation on three premix circuits to operation on six premix circuits. The gas turbine can be loaded by appropriate fuel scheduling. Startup can use high MWI fuel and transition to low MWI fuel during loading/unloading. Specifically, this would enable operating with low MWI fuel during Mode 3 and high MWI fuel during Modes 1, 2, 4 and 6 under low-to-mid load conditions.

Referring to the mode graph of FIG. 8, exemplary configurations of each combustor can have a plurality of normal operating modes on gas or liquid fuel. These modes are configured to support different portions of the operational range of gas turbine 10. A combustor is ignited in Mode 3, wherein gaseous NMHC fuel 216 is blended with at least one diluent of auxiliary steam 222, HRSG water 224, HRSG steam 226, and mixtures thereof to form a gaseous NMHC fuel mixture 218 having a lower MWI than gaseous NMHC fuel alone. The gas turbine rotor is then accelerated to 95% speed in Mode 2. Mode 2 has gas fuel supplied by the PM2 manifold 57 to the PM2 fuel nozzles. Mode 3 has the gaseous NMHC fuel mixture 218 supplied by PM1 manifold 56 to the PM1 fuel nozzle, and supplied by the PM2 manifold 57 to the PM2 fuel nozzles. During Mode 2, at approximately 95% turbine rotor speed condition, a transition to the Mode 1 premix mode occurs. This transition can initiate alternate non-blended fuel flow, such as LPG, or methane, in PM1 fuel circuit or manifold 56, and terminates fuel flow to gas manifold 57 and the PM2 fuel nozzles, allowing the rotor to achieve a full speed condition (100% speed) with minimal or reduced load application to the turbine rotor. This operational sequence provides constant fueling of PM 1 fuel manifold 56 for all rotor speeds and loads greater than the 95% speed, no load condition. As a result, PM 1 fuel manifold 56 does not require purge air at any time during operation. During Mode 1, purge air is supplied to PM 2 fuel manifold 57 and PM 3 fuel manifold 58. At a preselected gas turbine reference firing temperature condition between 100% rotor speed up to a minimal load condition, a mode transition to Mode 3 is initiated as PM 2 manifold 57 begins again fueling the combustor with gaseous NM IC fuel mixture 218 while PM 3 manifold 58 continues to be air purged. In Mode 3 premix mode, PM 1 manifold 56, and PM 2 manifold 57 are all fueled. The Mode 3 premix mode is a very stable, non-low emissions mode that can use either hot or cold fuel.

At approximately 25% load or higher, a mode transition to Mode 4 premix mode is scheduled, where the PM1 gas manifold 56 continues to supply gas to the PM1 fuel nozzle, the PM3 gas manifold 58 supplies gas fuel to the PM3 fuel nozzle, and the PM2 gas manifold 57 gas fuel flow is terminated. In Mode 4 premix mode, combustion dynamics are improved by maintaining a high MWI which has less combustion instabilities. Above approximately 50% load, Mode 6 is scheduled where high MWI gas fuel is supplied from manifold 56, 57, 58 and 59 to fuel nozzles PM1, PM2, PM3, and LLI respectively. In Mode 6, a secondary combustion system selectively actives the lean injection (LLI) 59 system. The secondary LLI combustion system 59 can have a lean direct injection (LDI) fuel injector assembly that separately supplies fuel and air to a separate reaction zone in the combustor. Acceptable flame stability and low dynamic pressures are simultaneously realized as a result of the ability of the fuel system to control axisymmetric fuel staging within combustion burning zone.

It should be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be controlled by special purpose hardware-based systems which perform the specified functions or acts, or combinations of special purpose hardware and computer instructions.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for starting and operating a non-methane hydrocarbon ("NMHC") fueled gas turbine combined cycle power plant, the method comprising:
    starting a heat recovery steam generator ("HRSG") to generate liquid HRSG water and HRSG steam;
    supplying a first portion of the liquid HRSG water to a NMHC vaporizer heat exchanger;
    supplying liquid NMHC fuel to the NMHC vaporizer heat exchanger to generate a gaseous NMHC fuel;
    injecting the gaseous NMHC fuel into a gaseous NMHC fuel treatment system;
    injecting a second portion of the liquid HRSG water into the gaseous NMHC fuel treatment system;
    mixing the second portion of the liquid HRSG water with the gaseous NMHC fuel in the gaseous NMHC fuel treatment system to form a gaseous NMHC fuel mixture;
    heating the gaseous NMHC fuel mixture with a fuel heating system; injecting the gaseous NMHC fuel mixture into a gaseous NMHC fuel distribution system;
    delivering the gaseous NMHC fuel mixture through the gaseous NMHC fuel distribution system to a combustor of a gas turbine of the NMHC fueled gas turbine combined cycle power plant
    starting an auxiliary boiler to generate auxiliary steam;
    supplying a first portion of the auxiliary steam to the NMHC fuel vaporizer heat exchanger to generate the gaseous NMHC fuel from a liquid NMHC fuel supply; and
    wherein mixing the second portion of the liquid HRSG water with the gaseous NMHC fuel in the gaseous NMHC fuel treatment system to form the gaseous NMHC fuel mixture comprises additionally mixing a second portion of the auxiliary steam with the gaseous NMHC fuel in the gaseous NMHC fuel treatment system.

2. The method of claim 1, further comprising:
supplying liquid NMHC fuel to a liquid NMHC fuel treatment system; and
injecting the liquid NMHC fuel from the liquid NMHC fuel treatment system into a liquid NMHC fuel distribution system; and
providing the liquid NMHC fuel through the liquid NMHC fuel distribution system to the combustor.

3. The method of claim 1, wherein the HRSG comprises a multi-pressure heat exchanger operating with at least three different operating pressures.

4. The method of claim 1, further comprising:
supplying gaseous non-NMHC fuel to a gaseous non-NMHC fuel treatment system;
injecting gaseous non-NMHC fuel from the gaseous non-NMHC fuel treatment system into a gaseous non-NMHC fuel distribution system; and
providing the gaseous non-NMHC fuel through the gaseous non-NMHC fuel distribution system to the combustor.

5. The method of claim 1, wherein the fuel heating system is downstream from the NMHC vaporizer heat exchanger.

6. The method of claim 1, wherein the gaseous NMHC fuel comprises ethane, propane, liquid petroleum gas ("LPG"), syngas, or a mixture thereof.

7. The method of claim 1, further comprising the step of igniting and accelerating the gas turbine.

8. The method of claim 1, further comprising exhausting the first portion of liquid HRSG water from the NMHC vaporizer heat exchanger via a vent.

9. The method of claim 1, wherein the fuel heating system utilizes the liquid HRSG water.

10. A method for starting and operating a non-methane hydrocarbon ("NMHC") fueled gas turbine combined cycle power plant, the method comprising:
starting an auxiliary boiler to generate auxiliary steam;
starting a heat recovery steam generator ("HRSG") to generate liquid HRSG water and HRSG steam;
supplying a first portion of the liquid HRSG water to a NMHC vaporizer heat exchanger;
supplying liquid NMHC fuel to the NMHC vaporizer heat exchanger to generate a gaseous NMHC fuel;
injecting the gaseous NMHC fuel into a gaseous NMHC fuel treatment system;
injecting a second portion of the liquid HRSG water into the gaseous NMHC fuel treatment system;
mixing the second portion of the liquid HRSG water with the gaseous NMHC fuel in the gaseous NMHC fuel treatment system to form a gaseous NMHC fuel mixture;
heating the gaseous NMHC fuel mixture with a fuel heating system;
injecting the gaseous NMHC fuel mixture into at least one preselected premix fuel circuit of a gaseous NMHC fuel distribution system coupled to a combustor of a gas turbine of the NMHC fueled gas turbine combined cycle power plant;
igniting the gas turbine;
operating the gas turbine by injecting the gaseous NMHC fuel mixture from the at least one preselected premix fuel circuit into the combustor for an initial time period;
accelerating the gas turbine to 100% speed while injecting the gaseous NMHC fuel mixture into the combustor after the initial time period;
loading the gas turbine after reaching about 100% speed while injecting the gaseous NMHC fuel mixture into the combustor
supplying a first portion of the auxiliary steam to the NMHC fuel vaporizer heat exchanger to generate the gaseous NMHC fuel from a liquid NMHC fuel supply; and
wherein mixing the second portion of the liquid HRSG water with the gaseous NMHC fuel in the gaseous NMHC fuel treatment system to form the gaseous NMHC fuel mixture comprises additionally mixing a second portion of the auxiliary steam with the gaseous NMHC fuel in the gaseous NMHC fuel treatment system.

11. The method of claim 10, further comprising:
supplying liquid NMHC fuel to a liquid NMHC fuel treatment system; and
injecting the liquid NMHC fuel from the liquid NMHC fuel treatment system into a liquid NMHC fuel distribution system; and
providing the liquid NMHC fuel through the liquid NMHC fuel distribution system to the combustor.

12. The method of claim 10, further comprising:
supplying gaseous non-NMHC fuel to a gaseous non-NMHC fuel treatment system;
injecting gaseous non-NMHC fuel from the gaseous non-NMHC fuel treatment system into a gaseous non-NMHC fuel distribution system; and
providing the gaseous non-NMHC fuel through the gaseous non-NMHC fuel distribution system to the combustor.

13. The method of claim 10, wherein the fuel heating system is downstream from both the NMHC vaporizer heat exchanger and the gaseous NMHC fuel treatment system.

14. The method of claim 10, wherein the gaseous NMHC fuel comprises ethane, propane, syngas, or a mixture thereof.

15. The method of claim 10, wherein the HRSG comprises a multi-pressure heat exchanger operating with at least three different operating pressures.

* * * * *